Figure 1:
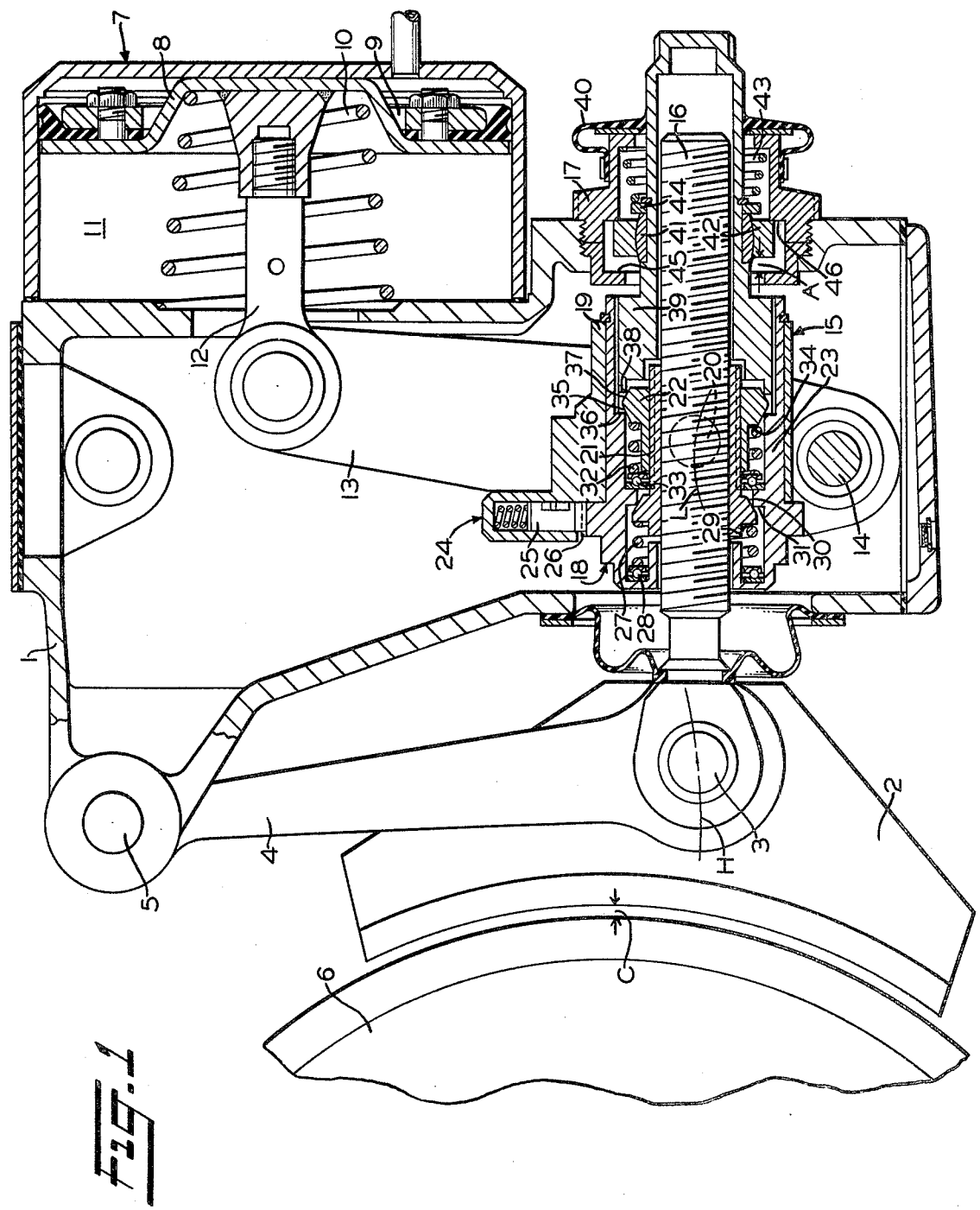

United States Patent [19]
Dubois et al.

[11] 3,884,333
[45] May 20, 1975

[54] TREAD BRAKE UNIT FOR RAILWAY VEHICLES

[75] Inventors: Claude Dubois, Gagny; Georges Dalibout, Paris, both of France

[73] Assignee: WABCO Westinghouse GmbH, Freinville-Sevran, France

[22] Filed: July 15, 1974

[21] Appl. No.: 488,822

[30] Foreign Application Priority Data
July 16, 1973 France .................. 73.26011

[52] U.S. Cl. .............................. 188/153 R; 188/74
[51] Int. Cl. ............................................. B60t 11/14
[58] Field of Search ....... 188/33, 52, 34, 74, 153 R, 188/196 D, 202, 203, 197, 204 R

[56] References Cited
UNITED STATES PATENTS

| | | | |
|---|---|---|---|
| 3,040,843 | 6/1962 | Polanin et al. .................. | 188/153 R |
| 3,430,739 | 3/1969 | Persson et al. .................. | 188/202 |
| 3,572,474 | 3/1971 | Persson .................. | 188/153 R X |

*Primary Examiner*—Duane A. Reger
*Attorney, Agent, or Firm*—R. W. McIntire, Jr.

[57] ABSTRACT

Ball and socket support means for the free end of a push rod of a tread brake unit including an automatic screw type slack adjuster for railway vehicles, said ball and socket support means providing flexibility to permit free nonbinding axial movement of the push rod notwithstanding that the path of such movement of the push rod, due to the push rod being pivotally connected to pivotally suspended members, is curvilinear rather than rectilinear.

9 Claims, 4 Drawing Figures

TREAD BRAKE UNIT FOR RAILWAY VEHICLES

BACKGROUND OF THE INVENTION

In a typical tread brake unit for railway vehicles, one end of the push rod is pivotally connected to one end of a brake shoe hanger, at which the brake shoe is also pivotally supported. Since the other end of the hanger is pivotally fixed to the housing of the brake unit, the brake shoe end, during brake application and release movement, moves in an arcuate path determined by the radial length of the hanger. Thus, the path of travel of the end of the push rod connected to the brake shoe end of the hanger also follows an arcuate path during brake application and release movement, all such movement of the hanger and the push rod taking place in a common plane.

Moreover, the push rod at some point between the ends thereof is normally pivotally connected to a point between the ends of a brake lever having one end pivotally fixed to the brake unit housing and the other end pivotally connected to a piston rod of a brake cylinder by which the brake unit is actuated. As previously noted in connection with the brake shoe hanger, due to the fact that the brake lever has one end pivotally fixed, the point of said brake lever at which the push rod is pivotally connected thereto, also moves in an arcuate path during brake application and release movement, which is also in the common plane of movement of the brake shoe hanger and the push rod. It becomes obvious, therefore, that the axial movement of the push rod is curvilinear rather than rectilinear.

Normally the type of tread brake unit above described includes an automatic slack adjuster portion for maintaining the proper clearance, when the brake shoe is in a release position, between the brake shoe and the wheel tread at all times. Thus, in well known manner, the slack adjuster measures the amount of travel of the push rod each time a brake application is made. The amount of such travel is compared to a predetermined fixed reference distance between two spaced-apart elements of the slack adjuster. If the amount of travel of the push rod is greater than the reference distance, or there is excessive slack in the brake unit leverage, the slack adjuster operates in conventional manner during brake release movement to take up the excessive slack so that the correct clearance is restored between the brake shoe and wheel tread prior to a subsequent brake application.

In the type of brake unit above described, the two spaced-apart elements are normally two annular elements, one of which is carried by the push rod and movable therewith, the other being fixed relative to the brake unit housing. The spaced-apart elements have oppositely facing surfaces for making abutting contact with each other during brake application movement of the push rod. If the amount of travel of the push rod is such that contact of the oppositely facing surfaces of the spaced-apart elements coincides with contact of the brake shoe with the wheel tread, the clearance between the shoe and the wheel, prior to initiation of the brake application, was correct. If, however, the movement of the push rod during the brake application phase exceeds the reference distance between the spaced-apart elements, that is, if the oppositely facing surfaces thereof make abutting contact before the shoe makes contact with the wheel, there is excessive slack in the brake leverage which will be taken up by the slack adjuster during the brake release phase of operation.

Due to the curvilinear path of travel of the push rod, as above explained, especially when excessive travel thereof occurs, the abutting faces on the spaced-apart elements do not necessarily make full or flush abutting contact, but may make tangential or partial contact because the element carried by the push rod may be cocked or at an angle relative to the element fixed on the housing. In this situation the comparison of actual travel of the push rod to the prescribed fixed reference distance between the spaced-apart elements is inaccurate and, in turn, causes the slack adjuster to effect an inaccurate adjustment. Moreover, any abutment of the facing abutting surfaces of the spaced-apart elements other than a flush abutment causes undue wear of said surfaces which again results in inaccurate operation of the slack adjuster.

SUMMARY OF THE INVENTION

It is the object of the present invention, therefore, to provide a tread brake unit including slack adjusting means for a railway vehicle and means for compensating for curvilinear movement of the push rod to insure accurate adjustment of slack in the brake unit, notwithstanding such curvilinear movement of the push rod.

Briefly, the invention comprises a ball and socket type support in the brake unit housing for the free end of the push rod, the ball portion of said arrangement comprising an annular element coaxially fixed on said free end of the push rod and movable therewith, said ball portion having a convex spherical surface on which the socket portion is free to move, said socket portion also comprising an annular element complementarily concentrically surrounding the ball portion. The annular socket portion is provided with a flat radial contact face adapted for making contact with an oppositely disposed contact face formed on the brake unit housing, the axial distance between said contact faces, when the brake unit is in a release disposition, being the reference distance coinciding with proper clearance between the brake shoe and the wheel. Thus, when the push rod moves axially for moving the brake shoe into engagement with the wheel, notwithstanding that such axial movement of the push rod may be curvilinear rather than rectilinear because it is connected to pivotally supported levers, the contact surface of the socket portion, being free to spherically roll on the ball portion, makes full and flush contact with the contact surface fixed on the brake unit housing, thereby providing an accurate reading of the amount of slack in the brake unit and, consequently, an accurate adjustment, if needed.

The arrangement above described may be varied by mounting the ball and socket on the housing and having the fixed contact face formed on an annular element axially fixed on the push rod. Another variation is a series of discs coaxially flexibly carried on the push rod, said discs being swingable about an axis perpendicular to the axis of the push rod, with the outer surfaces of the two end discs providing the abutting contact surfaces between the spaced-apart elements.

Figure 4:
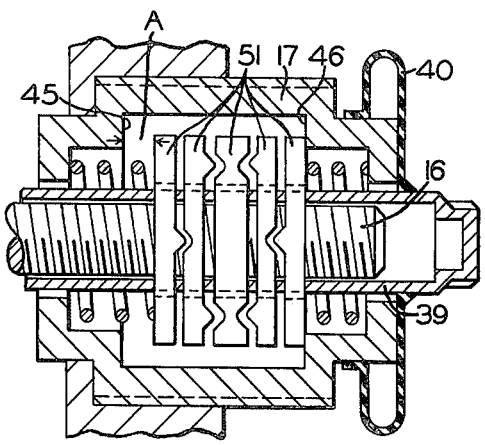
Figure 3:
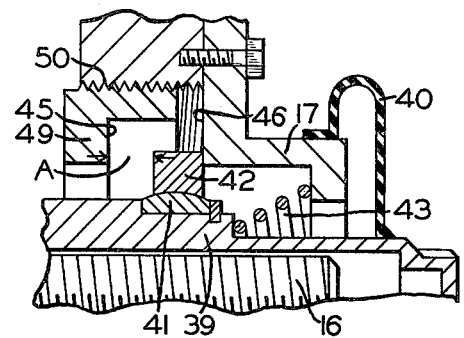
Figure 2:
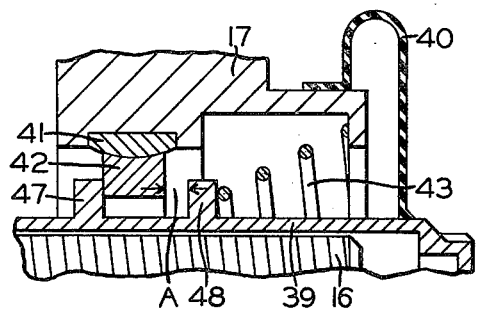

In the drawings, FIG. 1 is an elevational view, in section, of a tread brake unit embodying the invention;

FIGS. 2, 3, and 4 are fragmentary views of a portion of the tread brake unit showing several modifications of said portion of the unit.

DESCRIPTION AND OPERATION

As shown in FIG. 1, the tread brake unit embodying the invention comprises a housing 1 which is mounted on a wheel truck (not shown) of a railway vehicle. A brake shoe assembly 2 is pivotally carried by a pin 3 at the swinging or lower end, as viewed in the drawing, of a trunnion type brake shoe hanger 4, one leg of which is shown, the other or upper end of said brake shoe hanger being pivotally suspended from a pin 5 fixed in housing 1, said brake shoe being adapted for engaging the tread of a wheel 6.

A fluid pressure operable brake cylinder 7 of the brake unit is also supported on housing 1 and comprises a piston 8 subjectable to fluid pressure on one side adjacent a pressure chamber 9 for movement in a left-hand direction, as viewed in the drawing, to a brake-applying position, and to the biasing effect of a return spring 10 acting on the opposite side thereof adjacent a spring chamber 11 for movement of the piston in a right-hand direction to a brake release position in which it is shown. A piston rod 12 having one end flexibly connected to the side of piston 8 adjacent spring chamber 11 has the other end thereof pivotally connected to the swinging end of a trunnion type brake lever 13, one leg of which is shown, the other end of said brake lever being pivotally supported on housing 1 by a pin 14 fixed in said housing.

A push rod assembly 15 is also operably disposed in housing 1 and comprises a push rod 16 having one end pivotally supported on pin 3, on which the brake shoe assembly 2 is also supported on hanger 4, and the other end flexibly supported in a support portion 17 of housing 1. Push rod assembly 15 also includes an automatic slack adjuster unit 18 comprising an outer bushing 19 coaxially disposed relative to push rod 16. Push rod assembly 15 is pivotally connected to brake lever 13 by a pair of pins 20 fixed in each leg of the brake lever opposite to and in axial alignment with each other and pivotally disposed in the opposite adjacent walls of said outer bushing, said pins being located in said brake lever a greater distance from the end connected to piston rod 12 than the end connected at pin 14, thus providing appropriate mechanical leverage for producing the necessary brake-applying force. Pins 20 prevent rotation of outer bushing 19 about its axis.

As shown in FIG. 1, the automatic slack adjuster unit 18, which is a conventional type, comprises a set nut 21 screwed directly on the front end of push rod 16 and a take-up nut 22 screwed externally on said set nut. An inner bushing 23 is coaxially and snugly disposed within outer bushing 19 but capable of relative rotation therewith. Normally inner bushing 23 is locked against rotation relative to outer bushing 19 by a latch device 24 fixed to said inner bushing and including a spring biased latch member 25 engageable in one of a plurality of teeth formed around a radial collar 26 surrounding the front end of said inner bushing.

A compression spring 27 is compressed between a thrust bearing 28 resting against an inner radial annular surface of a front end flange on inner bushing 23 and a facing radial annular surface 29 formed on a flange portion of set nut 21. The other side of the flange formed on set nut 21 is provided with a beveled annular clutch surface 30 frictionally engageable by an adjacent annular shoulder 31 formed by an internal flange of inner bushing 23.

A second compression spring 32 is compressed between a thrust bearing 33 resting against the other side of the internal flange formed on inner bushing 23 and a facing radial annular surface 34 of a flange portion of take-up nut 22. The side of the flange portion of take-up nut 22 adjacent surface 34 is provided with a beveled annular clutch surface 35 frictionally engageable by an adjacent annular shoulder 36 formed internally on inner bushing 23, while the opposite side of said flange portion is provided with a beveled annular clutch surface 37 engageable by an adjacent annular shoulder 38 forming the front or inner end of a sleeve member 39 snugly but coaxially slidably supported on the rear end portion of push rod 16.

The rear end of sleeve member 39 and, therefore, the rear end of push rod 16 are supported in a flexible mounting 40 secured to support portion 17 of housing 1.

According to the invention and as above noted, the rear end of push rod 16 is provided with a partial ball and socket assembly including an annular convex member 41 comprising the ball portion of the assembly secured at a preselected axial position on said push rod for movement therewith. The radius of the spherical surface of convex member 41 is centered on the axis of push rod 16. An annular concave member 42 comprising the socket portion of the ball and socket assembly has an inner concave spherical surface complementing the outer convex spherical surface of member 41, thus providing the ball and socket action. A compression spring 43 encircling sleeve member 39 in support portion 17 of housing 1 is compressed between the rear wall of said support portion and a collar 44 axially fixed on the sleeve member in juxtaposition to convex annular member 41 for biasing said sleeve member in a left-hand direction, as viewed in the drawing.

Axial movement of concave member 42 and, therefore, of convex member 41 and sleeve member 39 is limited to movement of said concave member between oppositely facing, radially disposed annular contact surfaces 45 and 46 formed in support portion 17 of housing 1, the amount of such movement being indicated as A in FIG. 1 of the drawing. The distance A corresponds to the normal amount of clearance between brake shoe assembly 2 and wheel 6 with the brakes in a release position, said clearance being indicated as C in the drawing.

In operation, when fluid pressure is supplied to pressure chamber 9 of piston device 7, piston rod 12 is moved in a left-hand direction, as viewed in FIG. 1, causing brake lever 13 to be rotated in a counterclockwise direction about pin 14. As brake lever 13 is rotated in a counterclockwise direction, push rod 16 being connected to said brake lever by pins 20 is moved axially in a left-hand direction until brake shoe assembly 2 contacts wheel 6. Since the front end of push rod 16 is connected to the swinging end of brake shoe hanger 4, said front end of said push rod follows an arcuate path of travel H determined by the radius of brake hanger 4, whereas, since the midpoint of said push rod is connected to brake lever 13, which is pivoted oppositely to said brake hanger, said midpoint of the push rod follows an arcuate path of travel L disposed directionally opposite to path H and determined by the shorter radius from the axis of pin 14 to the axis of pins 20.

Thus, the path of travel of push rod 16 during axial movement thereof is curvilinear rather than rectilinear and, therefore, imparts a bailing action to the rear end of the push rod. Such bailing action of the push rod could result in an inaccurate indication of travel of the push rod 16 with respect to distance A, because, if it were assumed that members 41 and 42 were integrated into one solid member, any cocking of the push rod relative to the axis of annular contact surface 45 would cause tangential contact of said solid member with said contact surface rather than a flush contact. Thus, an inadvertent or inaccurate slack adjustment might be effected by the slack adjuster unit 18 in response to the inaccurate measurement of travel of push rod 16.

By providing the two separate ball and socket member 41 and 42 however, as above described, when concave member 42 comes into contact with surface 45, such contact will be flush, notwithstanding that push rod 16 may be cocked or at an angle relative to the axis of said contact surface.

Since the automatic slack adjuster unit 18 is of the conventional type and operates in well known manner to take up excessive slack in the brake unit, it is not deemed essential to an understanding of the invention to describe the operation thereof in detail. If clearance C between brake shoe 2 and wheel 6 is normal so that no adjustment is necessary following a brake application, all components of the slack adjuster maintain their respective positions relative to each other and the push rod 16 during the brake release phase of operation.

If, however, prior to a brake application the clearance between the brake shoe 2 and the wheel 6 is excessive so that push rod 16 must travel a greater distance than A or C before brake shoe 2 engages wheel 6, clutches 35 and 37 are disengaged by shoulders 36 and 38, thereby causing take-up nut 22 to be rotated relative to set nut 21 for a distance equivalent to the distance in excess of C traveled by said push rod in getting the brake shoe 2 against wheel 6. During the release stroke of push rod 16, clutch 30 is disengaged by shoulder 31 to cause set nut 21 to be rotated relative to both push rod 16 and take-up nut 22, so that said set nut and said take-up nut resume their original positions relative to each other, whereas push rod 16 now assumes a leftwardly extended position to compensate for excessive clearance between brake shoe 2 and wheel 6 prior to the brake application and thereby restore such clearance to normal clearance C.

The embodiment of the invention shown in FIG. 2 is a modification of the ball and socket arrangement for the rear end of push rod 16 and differs from the arrangement shown in FIG. 1 in that members 41 and 42 are mounted on the support portion 17 of housing 1 while the sleeve member 39 is provided with axially spaced annular shoulders 47 and 48 for limiting the amount of axial movement of said sleeve member to the increment A. Otherwise operation of the brake unit is similar to that described above in connection with FIG. 1.

In the embodiment shown in FIG. 3, that part of support portion 17, on which contact surface 45 is formed, is designated by reference numeral 49 and is axially adjustable relative to the main part of said support portion, on which contact surface 46 is formed, by complementary screw threads 50 on the two parts. This adjustable feature permits adaptation of the brake unit to various railway vehicles requiring different increments of clearance C between the brake shoe and the wheel.

The embodiment shown in FIG. 4 comprises a series of disc members 51 replacing the ball and socket arrangements shown in FIG. 1 through 3. The disc members are flexibly, coaxially mounted on sleeve member 39 with the center points of said discs axially fixed relative to said member. Discs 51, however, are flexibly, universally movable about their respective centers, so that upon contact of the disc on the extreme left end with contact surface 45, the discs may flexibly adjust to provide flush contact between said disc on the left end and contact surface 45.

Having now described the invention what we claim as new and desire to secure by Letters Patent is:

1. In a tread brake unit for braking the wheel of a railway vehicle, said unit comprising:
   a. a brake shoe having a release position, in which a predetermined normal amount of clearance is provided between the wheel and the brake shoe, and being operable to an application position for applying braking force to the wheel;
   b. a housing;
   c. a brake hanger having one end pivotally fixed on said housing with the other end thereof movable through a first arcuate path and having said brake shoe pivotally mounted thereon at a point between the ends of the brake shoe;
   d. power means supported on said housing for providing braking force for the brake shoe;
   e. a brake lever having one end pivotally fixed on said housing with the opposite end pivotally connected to the power means and movable through a second arcuate path disposed radially opposite to said first arcuate path; and
   f. a push rod assembly including a push rod having one end pivotally connected to said other end of said brake hanger concentrically relative to the pivotal mounting of said brake shoe and being pivotally connected, at a point of the push rod between the ends thereof, to a point of the brake lever between said one end and said opposite end thereof, said push rod having the other end thereof supported by said housing and being axially movable in a curvilinear path by said brake lever for transmitting braking force to the brake shoe; wherein the improvement comprises:
   g. flexible support means disposed between said housing and the other end of said push rod for providing universal movement of said other end of the push rod relative to the housing to compensate for the curvilinear axial movement of the push rod.

2. A tread brake unit, as set forth in claim 1, wherein said push rod assembly further comprises a sleeve member in which said other end of said push rod is coaxially slidably mounted for relative axial movement therebetween and wherein said flexible support means is interposed between said housing and said sleeve member.

3. A tread brake unit, as set forth in claim 2, wherein said push rod assembly further comprises a pair of axially spaced-apart annular shoulders formed on one or the other of said housing or said sleeve member and between which said flexible support means is reciprocably movable and engageable for limiting such movement and, therefore, axial movement of the sleeve member to a distance equivalent to said clearance between the brake shoe and the wheel.

4. A tread brake unit, as set forth in claim 3, wherein said shoulders are provided with respective oppositely facing, radially formed annular contact surfaces against which the respective adjacent opposite sides of said flexible support means make alternate abutting contact, the universal action of the flexible support means assuring that such abutting contact is flush.

5. A tread brake unit, as set forth in claim 3, including means for adjusting the axial distance between said spaced-apart shoulders.

6. A tread brake unit, as set forth in claim 4, wherein said flexible support means comprises a ball and socket assembly having an annular ball portion externally and coaxially fixed on said sleeve member and an annular complementary socket portion surrounding said ball portion, the opposite sides of said socket portion being disposed for making said abutting contact with said annular contact surfaces.

7. A tread brake unit, as set forth in claim 4, wherein said flexible support means comprises a ball and socket assembly having an annular ball portion internally fixed in said housing in coaxially surrounding relation to said sleeve member and an annular complementary socket portion surrounding said ball portion, the opposite sides of said socket portion being disposed for making said abutting contact with said annular contact surfaces.

8. A tread brake unit, as set forth in claim 4, wherein said flexible support means comprises a plurality of adjacently disposed disc members concentrically and flexibly mounted on said sleeve member in spaced-apart relation to each other to provide universal movement of said other end of the push rod relative to the housing, the discs at each end of said plurality of disc members being disposed for making said abutting contact with said contact surfaces.

9. A tread brake unit, as set forth in claim 4, wherein said push rod assembly further comprises slack adjusting means for adjusting the axial position of said push rod in the release position of the brake shoe to restore said predetermined clearance between the brake shoe and the wheel subsequently to a brake application in which the axial movement of the push rod exceeded the amount of said predetermined normal clearance.

* * * * *

UNITED STATES PATENT AND TRADEMARK OFFICE
CERTIFICATE OF CORRECTION

PATENT NO. : 3,884,333
DATED : May 20, 1975
INVENTOR(S) : Claude Dubois & Georges Dalibout It is certified that error appears in the above–identified patent and that said Letters Patent are hereby corrected as shown below:

Item [73] Assignee: change "WABCO Westinghouse GmbH" to --WABCO Westinghouse--

Signed and Sealed this

Eighteenth Day of January 1977

[SEAL]

Attest:

RUTH C. MASON
*Attesting Officer*

C. MARSHALL DANN
*Commissioner of Patents and Trademarks*